United States Patent [19]

Santora

[11] 4,251,367
[45] Feb. 17, 1981

[54] WASTEWATER TREATMENT
[75] Inventor: Scott A. Santora, Hammonton, N.J.
[73] Assignee: Waste Conversion Technology, Inc., Camden, N.J.
[21] Appl. No.: 6,271
[22] Filed: Jan. 25, 1979
[51] Int. Cl.³ .............................................. C02F 9/00
[52] U.S. Cl. .................................. 210/702; 210/779; 210/790; 210/806
[58] Field of Search ................... 210/73 S, 74, 202, 9, 210/73 R, 73 W, 76–78, 195.1, 253

[56] References Cited
U.S. PATENT DOCUMENTS

| | | | |
|---|---|---|---|
| 3,399,135 | 8/1968 | Conley et al. | 210/73 SG |
| 3,577,341 | 5/1971 | Keith et al. | 210/202 X |
| 3,638,793 | 2/1972 | Peck | 210/73 SG |
| 3,838,198 | 9/1974 | Bellamy et al. | 210/6 X |
| 3,925,205 | 12/1975 | Sparham | 210/73 SG |
| 3,959,124 | 5/1976 | Tchobanoglous | 210/73 SG |
| 4,053,399 | 10/1977 | Donnelly et al. | 210/44 |
| 4,076,515 | 2/1978 | Richard | 210/9 X |
| 4,156,648 | 5/1979 | Kuepper | 210/202 X |

Primary Examiner—Thomas G. Wyse
Attorney, Agent, or Firm—George A. Smith, Jr.

[57] ABSTRACT

Improved clarity in treated wastewater is achieved by adding a flocculating agent following screening by fine mesh screening means, preferably a centrifugal screen separator. The effectiveness of the separator is improved, in turn, by preceding it in the direction of liquid flow by a corrugated plate interceptor to remove greases and oils. Preferably, fine mesh screening is carried out by two separate screening devices, one being a high liquid volume centrifugal screen strainer, and the other being a mechanically self-cleaned low liquid volume device. Wastewater is delivered to a thickener, preferably a corrugated plate separator, the thickened product being delivered to the low liquid volume device, and the supernatant being delivered to the centrifugal screen strainer. The corrugated plate interceptor not only acts as a thickener, but also eliminates grease and oil, which would interfere with the operation of the centrifugal screen strainer.

Organic sludge produced in the system is recycled through a carbonization system comprising a loop dryer and a molten salt column to produce a high grade activated carbon adsorbent.

The throughput of an electrolytic flotation apparatus is enhanced by the incorporation of a corrugated plate interceptor in its outlet, in which reverse flow of particulate matter takes place.

5 Claims, 2 Drawing Figures

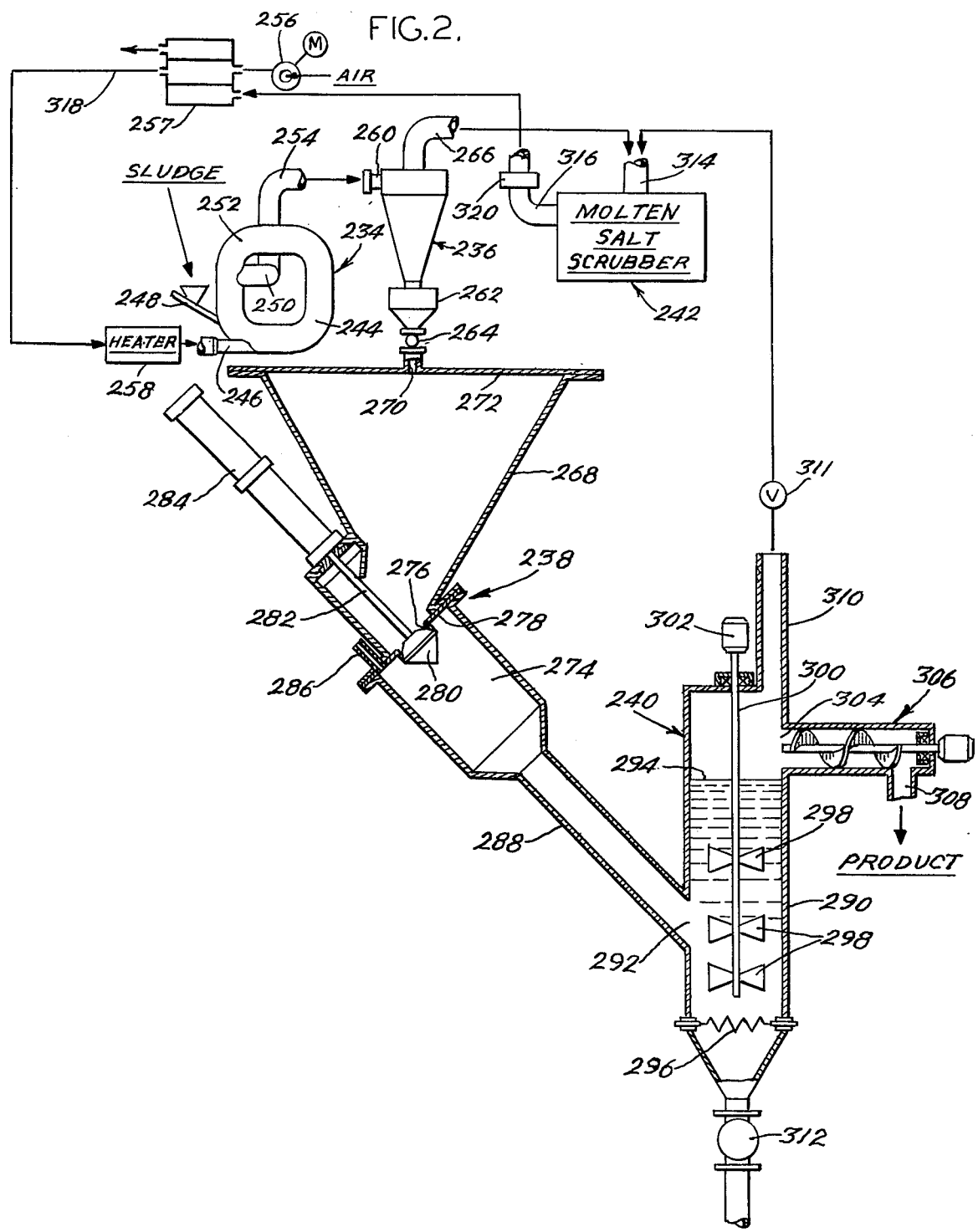

WASTEWATER TREATMENT

CROSS-REFERENCE TO RELATED APPLICATIONS

This application incorporates by reference the entire disclosure of the U.S. Pat. application of James F. Albus and Scott A. Santora, Ser. No. 6,291, filed Jan. 25, 1979 and the entire disclosure of the U.S. Pat. application of Scott A. Santora, Ser. No. 962,996, filed Nov. 22, 1978.

SUMMARY OF THE INVENTION

This invention relates to wastewater treatment, and particularly to a combined physical-chemical wastewater treatment process which is not dependent on biological action for its operation. The general objective of the invention is to receive untreated municipal or industrial sewage, and to convert the sewage into a clear and innocuous effluent, while accommodating wide variations in BOD and COD loading of the influent and in the temperature and toxicity of the influent, with minimum space and labor requirements.

In the past, a variety of systems and processes have been proposed for the physical-chemical treatment of wastewater. Some of these utilize flocculation for the purpose of separating particulate matter out of the liquid. Flocculation is accomplished by the addition of a flocculating agent, which usually consists of a combination of coagulants and polyelectrolytes which function to cause extremely fine particles suspended in the wastewater to agglomerate, and either float to the surface or sink to the bottom of the liquid depending on the density of the floc.

In general, in processes of this type, the flocculation agent has been added to the raw wastewater, or to wastewater from which only very large solids have been removed by means of bar screens or similar devices. Flocculation agents have also been added to wastewater from which some solids have previously been allowed to settle out in settling basins. In either case, however, the wastewater to which the flocculation agent is added has a relatively high solids content, and the action of the flocculating agent is unable to achieve good clarity in the effluent. In addition, where settling basins are used, land requirements are high.

In accordance with the invention, substantially all of the solid organic sludge in the wastewater is mechanically separated out by passing the wastewater through fine particle screening means. Only thereafter is a flocculating agent added to the wastewater. In the substantial absence of organic solids, the flocculating agent is able to remove extremely fine particles of phosphates, oil drops and other substances. The process is preferably carried out by removing substantially all of the organic solids from the wastewater by first removing coarse particles with a bar screen, then passing the wastewater through a rotary strainer to effect a further removal of solids, then settling out fine solids utilizing a corrugated plate interceptor, and finally by passing the wastewater through a vertical centrifugal screen concentrator. Desirably, the centrifugal screen concentrator is designed to remove substantially all particles above about 100 microns in size. Preferably, the centrifugal screen concentrator also removes a large percentage of particles below 100 microns in size.

The flocculating agent is introduced into the liquid passing through the outlet of the centrifugal screen device. After the addition of the flocculating agent, the wastewater is preferably delivered to an electrolytic flotation unit, in which extremely fine gas bubbles are generated electrolytically. These gas bubbles carry the floc formed by the action of the flocculating agent to the surface of the liquid where it is skimmed off. A corrugated plate interceptor is preferably provided at the outlet end of the flotation unit in order to prevent particles from being carried out with the effluent. The combination of the fine bubbles produced by electrolytic action and the corrugated plate interceptor allows the flotation apparatus to operate at an unexpectedly high liquid flow rate, while producing a high quality product.

Since most of the organic solids are removed before addition of the flocculating agent to the wastewater, it is possible to utilize flotation for the removal of the remaining extremely fine particles.

The use of activated carbon adsorption for the treatment of wastewater is helpful, particularly where the wastewater contains trace amounts of color, taste and odor-producing compounds and other organic contaminants. Activated carbon is particularly useful, because it removes nonbiodegradable organic substances and many toxic inorganic materials as well. However, it is subject to a number of disadvantages, in particular high equipment costs, and the high costs of the activated carbon itself.

Wastewater purification systems have been suggested in which activated carbon is produced directly from sludge which is settled out of the wastewater. The activated carbon is produced by pyrolysis in a furnace, is fed into the wastewater which flows out of a sludge settling basin, is settled out of the wastewater in a second settling basin, and is recycled into the incoming wastewater.

While the manufacture of activated carbon directly from sewage sludge has certain economic advantages over conventional activated carbon waste treatment systems, it has the disadvantage that heavy metals are accumulated in the system, which eventually find their way, in the form of heavy metal salts, into the effluent.

In accordance with the present invention, organic sludge is mechanically separated from the wastewater, and at least part of the sludge is introduced into a lower portion of a molten salt carbonizer. The carbonizer is a molten salt column in which pyrolysis of the sludge takes place to form an activated carbon which floats to the top of the molten salt, and is there recovered for use. The molten salt carbonizer continuously removes heavy metal salts from the system by causing them to dissolve and/or sink to the bottom of the column, where they are periodically removed. The activated carbon which is produced in this system is relatively free of heavy metal salts, and, as it is recirculated in the system through the molten salt carbonizer, any heavy metal salts which are picked up by the activated carbon are again removed and caused to dissolve and/or sink to the bottom of the column.

The system in accordance with the invention preferably utilizes a fine screen device, such as a vertical centrifugal screen concentrator, for the removal of very fine particles just prior to the introduction of the flocculating agent. The centrifugal screen concentrator, and similar fine screen devices are highly effective in removing particulate matter from wastewater. The centrifugal screen device, in particular, is capable of accommodating high liquid flow rates while separating out very fine particles. The presence of oils and greases in the wastewater interferes with the effective operation of centrifugal screen concentrators and other fine screen devices of the type lacking provisions for mechanical self-cleaning. In accordance with the invention, oils and greases are effectively separated from the wastewater before it reaches the fine screen device preferably by means of a corrugated plate interceptor, a separation device which causes oils and greases to float to the surface of the wastewater, where they are skimmed off for later removal. These oils and greases are preferably delivered along with settled sludge to a mechanically self-cleaned fine screen device, the output of which is recombined with the liquid output of the centrifugal screen device.

The centrifugal screen concentrator is a relatively high volume device so far as liquid flow rates are concerned. However devices of this type generally have the limitation that their solids output is accompanied by considerable quantities of water. In a typical centrifugal screen concentrator, for example, the water accompanying the solids output is between five and ten percent of the effluent volume.

Mechanically self-cleaned fine screen devices, on the other hand, are generally capable of accommodating only relatively low liquid flow rates, but are adapted to deliver comparatively dry solids. In accordance with the invention, a mechanically self-cleaned fine screen device receives the solids output from the centrifugal screen strainer, and the effluents of both devices are combined for maximum recovery of water.

In the preferred form of the invention the solids output of the centrifugal screen strainer, instead of being delivered directly to the mechanically self-cleaned device, is directed to the separation device containing the corrugated plate interceptor. The separation device inherently acts as a thickener for the solids so that thickened solids are delivered to the self-cleaning device, improving its efficiency of operation. The separation device thus serves a dual purpose: it eliminates oils and greases from the influent to the centrifugal screen strainer, and thus improves its operation; and at the same time it thickens the solids output of the centrifugal screen strainer for more efficient operation of the mechanically self-cleaned device.

The flocculating agent, which is introduced into the effluent of the fine screen devices, is recovered by skimming the surface of the electrolytic flotation unit, and dewatering the skimmed solids by means of a tube filter press. The coagulants, which are typically ferric chloride or aluminum sulfate, are converted to hydroxides in the flotation unit so that the filter cake contains high percentages of metal hydroxides such as ferric hydroxide or aluminum hydroxide. The filter cake is flash dried at high temperatures to destroy any bacteria present, and is then pelletized. The pelletized materials, which contain high concentrations of metals, can be used as ores for steel or aluminum production, or alternatively can be refined for reuse as coagulants in the system.

In the system, activated carbon, which is the adsorbent for organic contaminants, is preferably introduced at the earliest possible stage for maximum contact with the wastewater. Desirably, it is introduced into the effluent of the rotary strainer, and remains in contact with the liquid until it either floats to the surface or sinks to the bottom of the thickener. The carbon is eventually removed from the system through the mechanically self-cleaned fine screen device for disposal or regeneration. The retention time of the carbon is controllable, because the delivery of materials from the surface and from the bottom of the thickener to the mechanically self-cleaned device can be controlled by the intermittent operation of pumps.

DESCRIPTION OF THE DRAWINGS

FIG. 2 is a schematic diagram of the molten salt carbonization apparatus used for the generation of activated carbon for use in the treatment system of FIG. 1.

DETAILED DESCRIPTION

Figure 1:
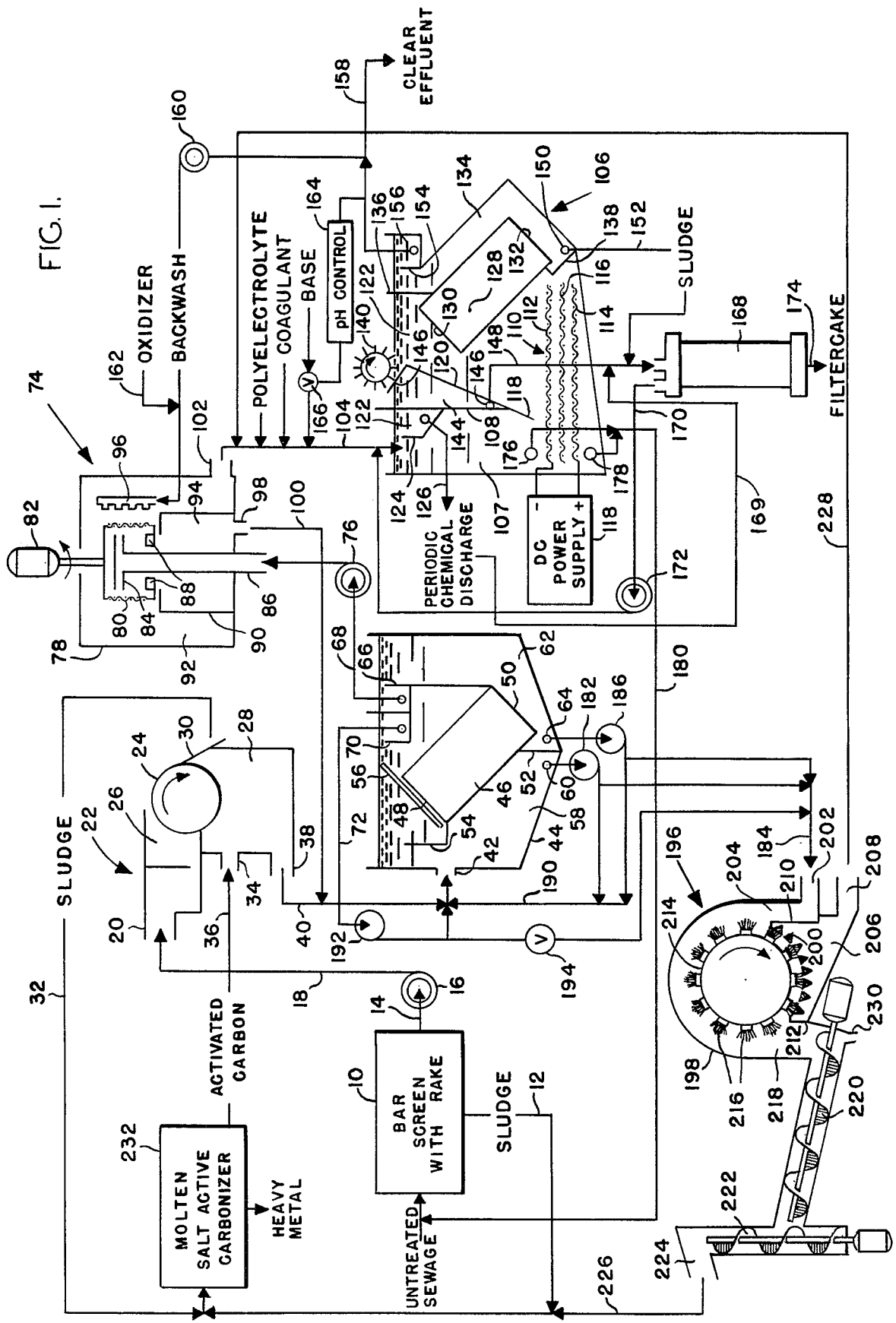
FIG. 1 is a schematic diagram of a wastewater treatment system in accordance with the invention.

Referring to FIG. 1, untreated sewage is first passed through a bar screen 10, which is preferably a screening device of the type described in U.S. Pat. No. 3,591,006, dated July 6, 1971, the disclosure of which is incorporated here by reference. This bar screen is provided with an automatic reciprocating rake which moves over the screen and carries accumulated solids up the face of the screen and onto a conveyor. The bar screen removes debris and very coarse solid material (e.g. all material having a minimum dimension of three inches), delivering them to sludge path 12. The liquid which passes through the screen is delivered to liquid path 14.

A pump 16, which is preferably a liquid pump of the impellerless type, delivers the screened liquid from path 14, through path 18 to the inlet 20 of a rotary strainer generally indicated at 22.

The rotary strainer comprises a rotatable cylindrical screen 24, which is arranged by means of suitable baffles so that liquid entering head box 26 through inlet 20 is required to pass into the interior of screen 24 and thence outwardly through the screen in order to reach tail box 28. Solids intercepted by screen 24 are carried, by rotation of the screen, to the location of doctor blade 30, which scrapes the solids off the exterior of screen 24. The solids are thus removed from the screen, and are delivered by means of a conveyor to path 32. The rotary strainer is preferably of the type described in Welles, Jr. U.S. Pat. No. 3,876,548, dated Apr. 8, 1975, the disclosure of which is incorporated by reference. The screen is preferably designed to pass solids less than 500 microns in diameter and to retain larger solids.

Activated carbon is introduced into tail box 28 through inlet 34 from activated carbon path 36. Liquid from tail box 28, along with activated carbon, is delivered through tail box outlet 38 and path 40 to inlet 42 of a separation vessel 44.

Separation vessel 44 contains a corrugated plate interceptor and various baffles for controlling the flow of liquids, including water, various greases and oils, and solid materials including solid wastes, and activated carbon. The principal element within vessel 44 is the corrugated plate interceptor 46, which is a multiple corrugated plate device of the type described in Cornelissen U.S. Pat. No. 3,346,122, dated Oct. 10, 1967, which is also incorporated by reference.

Stated briefly, the corrugated plate interceptor is in the shape of a rectangular prism, and has an upper opening 48 and a lower opening 50, and is otherwise closed. The interceptor contains an array of corrugated plates, the corrugations running lengthwise between openings 48 and 50, and the plates being spaced from each other to provide flow paths in the direction of the corrugations. Gutters (not shown) are provided at openings 48 and 50 to cause oils and solid materials to flow in the desired directions as they pass outwardly from between the corrugated plates.

Baffle 52 and baffle 54, acting together with the closed walls of interceptor 46 divide the interior of vessel 44 into two parts, and require liquid entering through inlet opening 42 to pass over baffle 54 in order to enter opening 48 of the separator. A flow distribution baffle 56 is provided over inlet opening 48 in order to produce an even distribution of flow at the inlet of the separator. As wastewater flows into vessel 44 through opening 42, some settling of solid material takes place in sludge compartment 58, and sludge in compartment 58 can be removed through sludge outlet 60 periodically. Much of the liquid which passes over baffle 54 flows downwardly into opening 48 of interceptor 46, and outwardly through opening 50 into chamber 62. Solids which accumulate at the bottom of chamber 62 can be removed periodically through outlet 64. Liquid which flows over weir 66 at the upper end of chamber 62 is delivered to path 68. Liquid which passes over weir 70 is delivered to path 72.

The interceptor operates by reason of the fact that, as liquid passes downwardly between the corrugated plates, a laminar flow condition is maintained. Under conditions of laminar flow, oils, greases, and solids which are lighter than water, tend to rise and collect in the peaks of the corrugations, in which they travel upwardly toward inlet opening 48 of the interceptor. The gutters at opening 48 are aligned with these peaks, and direct the flow of oils, greases and light solids toward weir 70 so that these materials are ultimately delivered to path 72.

Heavier solids, on the other hand, tend to accumulate in the troughs of the corrugated plates, and travel downwardly therein toward opening 50. The gutters at opening 50 are aligned with the troughs, and cause these solid materials which pass downwardly through opening 50 to be directed toward the bottom of chamber 62.

Separator vessel 44 performs several important functions. First, it is very effective in causing settling of solid materials. Secondly, it is very effective in removing oils and greases from the wastewater entering through inlet opening 42. The latter effect is important, because it markedly improves the operation of centrifugal screen concentrator 74, which receives liquid from path 68 through pump 76.

The centrifugal screen concentrator comprises an enclosure 78 in which is located a fine mesh screen 80 of generally cylindrical configuration. Screen 80 is arranged to be rotated about a vertical axis of rotation by motor 82. A flow distributor 84 receives liquid through a vertical central passage 86 from pump 76, and directs the liquid outwardly against the inner surface of the rotating screen 80. Baffles 88, which are carried by the screen assembly and rotate with it, deflect liquid which splashes off the screen back onto it. A generally cylindrical baffle 90 which is arranged symmetrically about the axis of rotation of the screen assembly, divides the interior of housing 78 into an outer chamber 92 and an inner chamber 94. Backwash spray nozzle assembly 96, which is located within outer chamber 92 is arranged to direct a flow of water against the outer surface of rotating screen 80. (Provisions may also be made to direct a flow of water against the inner surface of the screen if desired.) The backwash flow causes solid materials which accumulate on the inner surface of screen 80 to fall into chamber 94, along with excess liquid. The solids and liquid are delivered through outlet 98 to path 100. Liquid which passes through screen 80 into outer chamber 92 is delivered through outlet 102 to path 104.

Carbon particles are returned from strainer 74 to separator vessel 44 through path 100 so that they are maintained in contact with the wastewater for an extended period of time.

Rotating screen 80 is preferably a very fine mesh (i.e. at least 165 mesh) screen, and its ability to separate solids from the liquid entering the centrifugal screen concentrator is enhanced by the rotation of the screen. The relative velocity of the liquid flowing outwardly from distributor 84 with respect to the rotating screen 80 is not perpendicular to the screen. Hence, the screen is able to remove particles smaller than its mesh openings. In a typical installation, particles of less than 44 microns in diameter can be effectively removed. Liquid is forced through the cylindrical screen 80 by centrifugal action, while solid material, along with some liquid falls into inner chamber 94 through the opening in the lower part of the rotating screen assembly.

Centrifugal screen concentrators of the type described are available from a number of sources including Sweco, Inc., 6033 East Bandini Boulevard, Los Angeles, Calif. 90051. These concentrators are capable of handling relatively high liquid flow rates, but the solids output is accompanied by relatively large amounts of liquid.

The liquid output of concentrator 74 is delivered through path 104 to an electrolytic flotation cell 106. Quantities of polyelectrolytes and coagulants are added to the liquid in path 104, as are quantities of a base such as sodium hydroxide. Suitable polyelectrolytes include anionic, cationic or non-ionic polyelectrolyte resins such as Nalcolyte 607, Nalco 7134, Nalcolyte 7120, Nalcolyte 7182, Nalcolyte 7763 or Nalcolyte 603, all available from Nalco Chemcial Company, 180 North Michigan Avenue, Chicago, Ill. The choice of the best polyelectrolyte depends on the composition of the wastewater being treated in accordance with conventional wastewater treatment practice. Coagulants such as ferric chloride or aluminum sulfate are also added to alter the "zeta potential" of the liquid in order to allow fine suspended material to become neutralized so that it will float in the electrolytic flotation cell.

The flotation cell is a vessel having an array of baffles to control the flow of liquids therein and to direct the movement of solids being separated from the liquid by flotation. The liquid in path 104 is introduced into the left side of the cell into compartment 107 which is defined by the left wall of the cell and vertical baffle 108, which extends from above the surface of the liquid in the cell to a location sufficiently spaced from the bottom of the cell to allow room for an electrode assembly 110. The electrode assembly preferably comprises three layers of foraminous screens, the upper layer 112 and the lower layer 114 being of electrically conductive material such as stainless steel or graphite, and the intermediate layer 116 being of electrically insulating material such as polypropylene, and serving to prevent direct contact between the conductive layers. Conductive layers 112 and 116 are connected respectively to the negative and positive terminals of a direct current power supply 118, which delivers sufficient voltage and current to produce electrolysis of the liquid with the accompanying generation of minute bubbles of oxygen and hydrogen. (Other gases such as chlorine may be produced as well depending on the wastewater contents and on the electrode composition.) These bubbles rise in the liquid above the electrode screens, and cause the agglomerated solids to rise to the surface of the liquid.

The lower end 118 of sloping baffle 120 is positioned so that most of the bubbles generated by the electrodes rise into compartment 122 to the right of baffle 120, and a relatively small proportion of the bubbles rise within left-hand compartment 107. Solids which float upwardly in compartment 107 are eventually collected in compartment 122, which is located between baffle 108 and weir 124, and are discharged from compartment 122 through path 126.

A corrugated plate interceptor 28 is provided within the flotation cell, with its inlet opening 130 in communication with the upper portion of compartment 122, and with its lower opening 132 in communication with a right-hand chamber 134, which is separated from compartment 122 by means of baffles 136 and 138, and by the interceptor itself.

Flow of liquid takes place downwardly through the interceptor from compartment 122 into chamber 134, and much of the fine solids which would otherwise be carried by the flow of liquid into chamber 134 rise into the peaks of the corrugations in the interceptor, and reverse their direction, whereupon they rise to the surface of the liquid in compartment 122. The solids which rise to the surface of compartment 122 are removed by a rotating scraper 140, which carries the solids over baffle 142 into compartment 144, which is located between baffles 108 and 120. An outlet port 146 is provided at the bottom of compartment 144, and from it, settled solids are delivered into path 148. The liquid passes upwardly through compartment 134 and over weir 154 into chamber 156, from which it is discharged as a clear effluent through path 158.

In the event of a system upset resulting in the presence, in the electrolytic flotation cell, of heavy solids which do not float to the surface, some of these solids are carried into interceptor 128. These heavier solids within the interceptor are accumulated in the troughs of the plates, and settle at the bottom of compartment 134, where they are removed through outlet port 150 into path 152.

Occasional solids which accumulate at the bottom of electrolytic flotation cell 106 are discharged through outlet ports 176 and 178, respectively above and below the electrode screens, and through path 180 back to the inlet of bar screen 10.

A portion of the effluent in path 158 is delivered by means of pump 160 to backwash spray nozzle assembly 96 within concentrator 74. An oxidizer, such as chlorine or ozone is added to the backwash path through path 162.

The pH of the effluent in path 158 is desirably controlled automatically by a pH control apparatus 164, which measures the pH of the effluent in path 158, and controls the flow of the base into path 104 by controlling the operation of valve 166. In this way, compensation is made for the acidity of the coagulant.

Chemical sludge which accumulates in compartment 144 is delivered through path 148 to a tube filter press 168, which is used to dewater the chemical sludge to provide a useful product. The filter press also periodically receives chemical sludge from the bottom of chamber 134 through path 152 and from compartment 122 through path 169. A suitable tube filter press is available from Aerodyne Development Corp., 29085 Sollon Road, Cleveland, Ohio 44139. The tube filter press consists of an outer cylinder, a rubber bladder and a perforated inner cylinder completely covered with filter cloth. Hydraulic fluid is used to compress the bladder inwardly in order to compress the sludge against the filter cloth covering the inner cylinder.

Filtration is accomplished from outside to inside, and the perforations in the inner cylinder conduct the filtrate into the center to be carried away through path 170 and delivered by pump 172 back to compartment 107 of the electrolytic flotation cell. With the rubber bladder dilated against the outer case of the filter press, a charge of sludge enters the press through path 148. This charge partly fills the volume contained within the bladder and the ends of the cloth covered perforated core. At this time, hydraulic fluid enters between the outer case and the bladder, which compresses the bladder inwardly to commence filtration. Liquid is forced through the cloth and the perforations in the core, while solids remain between the bladder and the cloth filter, forming a filter cake. The bladder is again dilated by applying a vacuum behind it, and the inner cylinder is lowered, whereupon a blast of air removes the filter cake through path 174. This cycle of operation is then repeated.

Coagulants such as ferric chloride and aluminum sulfate form ferric hydroxide or aluminum hydroxide in water in the electrolytic flotation cell. The sludge in compartment 144 consists of fine suspended solids along with ferric hydroxide or aluminum hydroxide. When the sludge is dewatered in filter press 168, the filter cake can be flash dried at high temperatures to destroy bacteria and then pelletized. The final pelletized materials, having high concentrations of either iron or aluminum can be used as ores for steel or aluminum production, or alternatively can be used in the manufacture of various useful chemical products, including coagulants for use in this system.

There are, of course, many possible inorganic coagulants in addition to ferric chloride and aluminum sulfate. However, ferric chloride and aluminum sulfate are considered to be the most practical coagulants at the present time, ferric chloride being preferred.

Sludge discharged through ports 60 and 64 at the bottom of separation vessel 44, and through port 150 at the bottom of compartment 134 of flotation cell 106 is used, along with the solid material discharged by bar screen 10 in sludge path 12, to manufacture activated carbon for use in the system. Sludge discharged through port 60 is delivered through pump 182 to path 184. Sludge discharged through port 64 is delivered by pump 186 to path 184. Pumps 182 and 186 are also arranged to return sludge through path 190 to inlet 42 of separation vessel 44 if desired, suitable valving (not shown) being provided. Accumulated oil and grease, which pass over weir 70 in vessel 44 along with other floating solids, are delivered through path 72 and pump 192 to separation vessel inlet 42, but by opening valve 194, these materials can alternatively be delivered to path 184.

Path 184 is the inlet of a self-cleaning rotary brush microstrainer 196, which is preferably a fine screen device producing an output of relatively dry solids, as compared with centrifugal screen concentrator 44, but having a somewhat lesser capability in terms of liquid volume. The "MICRODREX" microstrainer, manufactured by Idrex, Inc. of 1018 Lambrecht Drive, Frankfort, Illinois is an example of a suitable microstrainer. Microstrainer 196 comprises a housing 198, in which there is located an array of triangular screen elements 200, in the form of a portion of a circular cylinder. The triangular screen elements are preferably spaced from each other by approximately 100 microns or less. Liquid containing finely divided solids entering the microstrainer from path 184 through inlet 202 is guided upwardly through passage 204 onto the upper side of screen 200, and falls through the screen into chamber 206, and outwardly through outlet 208. Chamber 206 is defined by walls 210 and 212 at the respective ends of the screen, so that liquid is required to fall through the screen in order to enter chamber 206. A cylinder 214, carrying a series of brushes 216 on its outer surface is arranged to rotate in a clockwise direction, and is positioned so that its brushes come into contact with screen 200, and remove solids continuously by brushing them off the left end of the screen (at wall 212), and into downward passage 218, which leads to an inclined, motor-driven screw conveyor 220. Conveyor 220 leads to a vertical screw conveyor 222, having an outlet 224 in communication with path 226.

Liquid from microstrainer 196 is delivered through outlet 208 and path 228 back through path 104 to the inlet of flotation cell 106. Water is drained from the solid material in inclined conveyor 220 through outlet 230, and the solids are delivered through path 226 to a molten salt active carbonizer 232. Carbonizer 232 receives carbonaceous sludge from microstrainer 196, from bar screen 10 and from rotary strainer 22 (through path 32), and converts the sludge into a high quality activated carbon by first flash drying the carbon in a sludge conditioner, and passing the product of the conditioner into a molten salt column, wherein the sludge particles are carbonized and caused to float to the surface of the column for removal into path 36.

The details of carbonizer 232 are shown in FIG. 2. The principal components of the system are a sludge conditioner 234, a cyclone separator 236, a pneumatic conveyor 238, a molten salt column 240, and a molten salt scrubber 242.

Sludge conditioner 234 is preferably a closed-loop flash dryer of the type described in the copending application of Francis E. Albus and George W. Fendler, Ser. No. 911,889, filed June 2, 1978. The dryer comprises a generally toroidal conduit 244 having a horizontally disposed air inlet nozzle 246 arranged to direct a stream of heated air into conduit 244 in a tangential direction in order to induce a recirculating flow in the loop. A material feeder 248 is arranged to feed wet sludge into the circulating stream of hot air in conduit 244. In the preferred form of dryer, the feeding device is arranged so that the sludge is fed into the loop at a point preceding the hot air inlet nozzle so that the sludge entering the loop is immediately subjected to the influence of the hot air entering the loop through the nozzle. An outlet 250 is provided in communication with the interior of conduit 244, the outlet opening being on the interior side of the loop, and preceded in the direction of flow by a curved portion 252 of the conduit so that centrifugal force tends to maintain large particles and wet particles toward the exterior of the loop, while allowing small, dry particles to exit from the loop through outlet 250. Outlet 250 is in communication with an outlet conduit 254.

Air is delivered to the dryer inlet nozzle 246 through path 318 by a low pressure motor driven blower 256, which is followed by a heat exchanger 257. Heat exchanger 257 receives the exhaust of scrubber 242, and transfers a part of the heat to air in path 318. An auxiliary air heater is provided at 258. This auxiliary air heater can be fueled by natural gas, propane, oil, coal, or other combustible material. The temperatures of the air at inlet nozzle 246 can be as high as 815° C., or possibly even higher.

While various alternative forms of sludge conditioners can be used in the system, the loop dryer is preferred because of its inherent ability to classify particles, i.e. to separate wet particles and large particles from fine, dry particles. The loop dryer thereby provides a product at conduit 254 which is relatively uniform in particle size and in moisture content. Alternative forms of flash dryers, i.e. dryers which operate by subjecting the wet particles to the effect of a moving stream of hot air or other gas, have in common with the loop dryer the virtue of efficient drying because of the combined effects of heat and air transpiration. The loop dryer, however, generally produces a more uniform product.

The fine, dry particles which exit from the dryer through conduit 254 are delivered to inlet 260 of cyclone separator 236, in which the particles are separated from the air or other gas in a well-known manner. The particles are collected in a dust trap 262, from which they can be removed by the operation of rotary valve 264. The air or other gas which accompanied the particles in conduit 254 is delivered from the cyclone separator at the top through outlet conduit 266.

Various alternative devices for separating gas from particulate matter, such as the Aerodyne Dust Collector, available from Aerodyne Development Corporation of Cleveland, Ohio can be used in place of cyclone separator 236.

Pneumatic conveyor 238 comprises a hopper 268 arranged to receive dry sludge particles passed from dust trap 262 through rotary valve 264 and opening 270 in hopper cover plate 272. The interior of the hopper communicates with a pressurizing chamber 274 through an opening 276 in baffle 278, the opening being closable by a material valve 280, controlled through rod 282 by a hydraulically operated valve actuating cylinder 284. A compressed air inlet 286 is provided in pressurizing chamber 274, to force material out of chamber 274 into passage 288.

In operation of the pneumatic conveyor, valve 280 is opened intermittently to allow sludge particles to fall from the hopper into pressurizing chamber 274. After the valve is closed, air or inert gas is introduced through air opening 286 to force the material downwardly through passage 288 into molten salt column 240, in which the carbonization of the sludge takes place.

Molten salt column 240 comprises a generally cylindrical vertically disposed column 290 having an opening 292 at an intermediate level, through which material is introduced into the molten salt bath by the pneumatic conveyor through passage 288. Molten salt is maintained to a level indicated at 294, well above opening 292. The salt bath is maintained in the molten condition by a suitable heating means, for example by an electrical resistance heater 296. A series of stirring blades 298 are submerged in the molten salt bath and operated through shaft 300 by motor 302. Level 294 of the salt bath is situated just below outlet opening 304, to which is connected a motor-driven screw conveyor assembly 306 for the delivery of a solid product through outlet 308. A gas exhaust passage is provided at the upper end of the column at 310, and a high temperature valve 312 is provided at the lower end of the column for the intermittent removal of heavy-metal containing material from the lower end of the molten salt column.

Exhaust passage 310 of the molten salt column communicates through control valve 311 with inlet 314 of scrubber 242, which is preferably of the type described in U.S. Pat. No. 3,647,358 to Jacob Greenberg, dated Mar. 7, 1972. This scrubber also receives the mixture of gas and particles exhausted from cyclone separator 236 through its outlet 266. Outlet conduit 316 of the scrubber is in communication through path 318 with the high temperature gas inlet of heat exchanger 257, a fan 320 being provided in the conduit. Heat from the exhaust gases of the scrubber is transferred to the air entering the sludge conditioner through path 318. Consequently, exhaust heat from the scrubber is utilized in the loop dryer to reduce the energy requirements of the system.

The salts and salt mixtures described in Greenberg U.S. Pat. No. 3,647,358 can be used in the carbonizer of FIG. 2, but preferably hydrated salts such as sodium hydroxide, potassium hydroxide and lithium hydroxide or mixtures thereof are used in a temperature range between about 205° C. and 650° C. Oxidizers such as potassium chromate, sodium nitrate and the like can be used, but large proportions of oxidizers in the salt mixture will interfere with the carbonization process and reduce the yield of activated carbon at product outlet 308.

In operation, preconditioned sludge is introduced into the carbonization column intermittently by the operation of pneumatic conveyor 238, and is delivered to an intermediate level in the molten salt column. Carbonization of the sludge particles takes place in the column, and activated carbon particles are formed. These activated carbon particles float to the surface 294 of the salt bath, forming a layer which is removed by the operation of screw conveyor 306. In the column, ash, including heavy metal salts such as cadmium, chromium and lead salts, sinks to the bottom of the column. Those heavy metal salts which do not dissolve sink to the bottom of the column directly. Some heavy metal salts dissolve in the salt bath, however, and sink to the bottom only when the concentration of heavy metal salts in the column reaches a saturation point. The ash is removed intermittently by opening high temperature valve 312. Separation takes place within the column by gravity, and a relatively pure activated carbon is delivered at product outlet 308.

Importantly, the preconditioning of the sludge by flash drying results in a sludge having a very large surface area per unit weight because of the rapid expansion of the sludge particles as they encounter the moving stream of hot air in the dryer. The large surface area of the sludge particles insures complete carbonization in the column, and also improves the adsorbent qualities of the activated carbon which is produced. A loop dryer, as opposed to conventional flash dryers, is preferred in the system of FIG. 2 by reason of its ability to deliver particles having a relatively uniform size range and moisture content.

The activated carbon delivered through product outlet 308 is preferably washed with water, steam, or acid in the case where hydrated salts are used in the column, and is dewatered by screening or other means and dried. The activated carbon can be dried in a loop dryer for example.

As will be apparent, the system of FIG. 2 utilizes the sludge produced by the operation of various components of the system of FIG. 1 to produce a high quality activated carbon, which is used, in turn, as an adsorbent for the removal of organic components of the wastewater being treated by the system. It will also be noted that, as the system is a closed loop, the sludge delivered to the loop dryer in FIG. 2 contains a proportion of spent activated carbon particles. The spent activated carbon is delivered to the molten salt column, and is there reactivated for further use. Adsorbed organic materials are removed by scrubber 242, and any heavy metal salts which would otherwise become accumulated in the sludge or in the activated carbon are collected at the bottom of the molten salt column, and removed through valve 312.

The principal advantages of the invention can be summarized as follows. First, the introduction of flocculating agents following screening by fine mesh screening means produces a highly effective removal of organic matter from the wastewater with only modest space requirements, and the use of a centrifugal screen separator for fine mesh screening produces results far superior to those achieved heretofore.

The effectiveness of the centrifugal screen separator is markedly improved by preceding it in the general direction of liquid flow by a corrugated plate interceptor, which removes greases and oils from the wastewater, which would otherwise interfere with the operation of the centrifugal screen device.

In the preferred system, fine particle screening is carried out by the use of two separate screening devices, one being preferably a vertical centrifugal screen strainer, and the other being a mechanically self-cleaned device having triangular screen elements. Prior to its introduction to these screening devices, the wastewater is subjected to a thickening step, preferably carried out at least in part by the use of a corrugated plate interceptor. The thickened material is delivered to the self-cleaning device, while the remaining wastewater is delivered to the centrifugal screen device. The effluents of the screening devices are then recombined for further treatment by flocculation. Significantly, the corrugated plate device serves a dual function in that it separates grease and oil from the wastewater, thereby improving the operation of the centrifugal screen device, and at the same time effects thickening of the solids content of the wastewater for the most effective operation of the low liquid volume mechanically self-cleaned microstrainer. In this way maximum recovery of water is achieved efficiently. The use of the thickener also allows sufficient contact time between the activated carbon and the wastewater being treated to permit effective adsorption to take place.

In the preferred form of the system, organic sludge, which is removed by the various screening and settling devices in the system is recycled through a molten salt active carbonizer to produce a high-quality activated carbon, which is used to adsorb organic substances in the wastewater. The molten salt active carbonizer, by removing heavy metals from the recirculating system, makes it possible to recycle sludge effectively.

Flocculating agents are added to the effluent of the screening devices, and removal of chemical sludge takes place in an electrolytic flotation cell incorporating a corrugated plate interceptor, in which electrolytically produced bubbles cause a reverse flow of solid material to take place for effective final treatment of the wastewater.

Finally, contact time of the activated carbon in the system is maintained by the recycling of carbon from the centrifugal screen device to separation vessel 44, and effective control of the activated carbon retention is achieved by the capability of removing spent activated carbon from the separation vessel.

I claim:

1. A wastewater treatment process comprising the steps of:

separating coarse solids from wastewater to produce a first product substantially free of coarse solids;

effecting thickening of the remaining fine solids to produce a second product consisting essentially of fine solids and water, and a third separate product consisting essentially of water with a proportion of fine solids substantially less than the proportion of fine solids in the second product;

passing the second product through a first fine particle screen to separate solids from water in said second product while continuously cleaning said first screen by mechanical means;

passing the third product through a second fine particle screen, thereby separating fine solids from water in said third product; and recovering, as a final product, a liquid comprising substantially all of the water produced in both of said passing steps.

2. A process according to claim 1 in which the step of passing said third product through said second fine particle screen is carried out by means of a centrifugal screen separator.

3. A process according to claim 1 in which said thickening step is carried out at least in part by means of a corrugated plate interceptor.

4. A process according to claim 1 in which the solids separated from water in said third product are recombined with said first product and subjected to thickening in said thickening step.

5. A process according to claim 1 in which the step of passing said third product through said second fine particle screen is carried out by means of a centrifugal screen separator, in which said thickening step is carried out at least in part by means of a corrugated plate interceptor, and in which said corrugated plate interceptor also serves to eliminate oil and grease from said third product, thereby preventing substantial quantities of oil and grease from reaching and interfering with the operation of said centrifugal screen separator.

* * * * *